US011984137B2

(12) United States Patent
Takaya

(10) Patent No.: US 11,984,137 B2
(45) Date of Patent: May 14, 2024

(54) TWO-WAY COMMUNICATION SUPPORT SYSTEM AND STORAGE MEDIUM

(71) Applicant: SHARP KABUSHIKI KAISHA, Sakai (JP)

(72) Inventor: Mamoru Takaya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 66 days.

(21) Appl. No.: 17/558,447

(22) Filed: Dec. 21, 2021

(65) Prior Publication Data

US 2022/0208216 A1 Jun. 30, 2022

(30) Foreign Application Priority Data

Dec. 28, 2020 (JP) ................................. 2020-219237

(51) Int. Cl.
*G10L 25/63* (2013.01)
*G10L 25/06* (2013.01)
*G10L 25/78* (2013.01)

(52) U.S. Cl.
CPC .............. *G10L 25/63* (2013.01); *G10L 25/06* (2013.01); *G10L 25/78* (2013.01)

(58) Field of Classification Search
CPC ......... G10L 25/63; G10L 25/06; G10L 25/78; G10L 25/48; G06V 40/172; G06V 40/174; H04M 2203/1025; H04M 2203/2038
See application file for complete search history.

(56) References Cited

U.S. PATENT DOCUMENTS

| 8,521,525 | B2 | 8/2013 | Fujino | |
|---|---|---|---|---|
| 2006/0122834 | A1* | 6/2006 | Bennett | G10L 15/1822 704/E15.047 |
| 2010/0250249 | A1* | 9/2010 | Fujino | H04N 7/147 704/235 |
| 2019/0019498 | A1* | 1/2019 | Hardee | G10L 13/08 |
| 2019/0103110 | A1* | 4/2019 | Kawano | G10L 15/22 |
| 2019/0385480 | A1* | 12/2019 | Suzuki | G06N 3/08 |
| 2021/0176429 | A1* | 6/2021 | Peters | G06V 20/41 |
| 2022/0208216 | A1* | 6/2022 | Takaya | G10L 25/78 |
| 2023/0222932 | A1* | 7/2023 | Zhou | G06V 40/174 434/309 |

FOREIGN PATENT DOCUMENTS

JP 2010-232780 A 10/2010

* cited by examiner

*Primary Examiner* — Fariba Sirjani
(74) *Attorney, Agent, or Firm* — ScienBiziP, P.C.

(57) ABSTRACT

A two-way communication support system supports two-way communication between a second terminal device which receives, from a first terminal device, first state data changed according to the state of a first user present on a side where the first terminal device is arranged and which outputs an image and a voice indicated by the first state data and the first terminal device. The two-way communication support system includes a state identifier and an output controller. The state identifier analyzes second state data changed according to the state of a second user present on a side where the second terminal device is arranged so as to identify the state of the second user. The output controller causes the first terminal device to output analysis information indicating a result of the identification of the state of the second user performed by the state identifier.

9 Claims, 11 Drawing Sheets

TWO-WAY COMMUNICATION SUPPORT SYSTEM AND STORAGE MEDIUM

INCORPORATION BY REFERENCE

This application claims the benefit of priority under U.S.C. 119 based on Japanese Patent Application No. 2020-219237 filed on Dec. 28, 2020, the entire contents of which are incorporated herein by reference.

BACKGROUND

The present disclosure relates to two-way communication support systems and storage media.

In a communication control device disclosed in Patent Literature (Japanese Unexamined Patent Application Publication No. 2010-232780), the sound volume level of speaking is acquired from a speaker in a videoconference. Then, when the sound volume level is less than a threshold value, the communication control device performs voice recognition to transmit text data to the other communication control devices. In the communication control device which receives the text data, in an individual region corresponding to the communication control device of the sender, display text is displayed. In this way, only when the voice volume of the speaker is small and thus it is thought that a person at the other end has difficulty hearing the voice, the text data is transmitted. In other words, the text data is transmitted, only if needed, according to the state of speaking of the speaker.

However, in the communication control device disclosed in the patent literature, the text data indicating the same content as spoken content is generated. Hence, on the videoconference screen of the communication control device which receives the text data, the display text based on the text data is displayed. Then, the participant in the videoconference needs to read sentences indicated by the display text. In particular, as the number of participants in the videoconference is increased, the amount of display text displayed on the videoconference screen is increased. This can result in the occurrence of a situation in which the participants cannot follow the display text so as not to read the sentences indicated by the display text.

In addition, in the communication control device disclosed in the patent literature, the spoken content of the speaker is simply displayed as the display text on the videoconference screen of the listener. Hence, the speaker needs to recognize the state of the listener (for example, the reaction of the listener) from the videoconference screen. In particular, as the number of participants in the videoconference is increased, the number of participants displayed on the videoconference screen is increased. Hence, it is difficult for the speaker to recognize the states of all the listeners from the videoconference screen.

The present disclosure is made in view of the problems described above, and an object thereof is to provide a two-way communication support system in which a speaker can easily recognize the state of a listener and a storage medium.

SUMMARY

According to a first aspect of the present disclosure, a two-way communication support system supports two-way communication between a second terminal device which receives, from a first terminal device, first state data changed according to a state of a first user present on a side where the first terminal device is arranged and which outputs an image and a voice indicated by the first state data and the first terminal device. The two-way communication support system includes a state identifier and an output controller. The state identifier analyzes second state data changed according to a state of a second user present on a side where the second terminal device is arranged so as to identify the state of the second user. The output controller causes the first terminal device to output analysis information indicating a result of the identification of the state of the second user performed by the state identifier.

According to a second aspect of the present disclosure, a non-transitory computer-readable storage medium stores a computer program. The computer program instructs a computer of a two-way communication support system that supports two-way communication between a second terminal device which receives, from a first terminal device, first state data changed according to a state of a first user present on a side where the first terminal device is arranged and which outputs an image and a voice indicated by the first state data and the first terminal device to perform: analyzing second state data changed according to a state of a second user present on a side where the second terminal device is arranged so as to identify the state of the second user; and causing the first terminal device to output analysis information indicating a result of the identification of the state of the second user.

DETAILED DESCRIPTION

Figure 1:
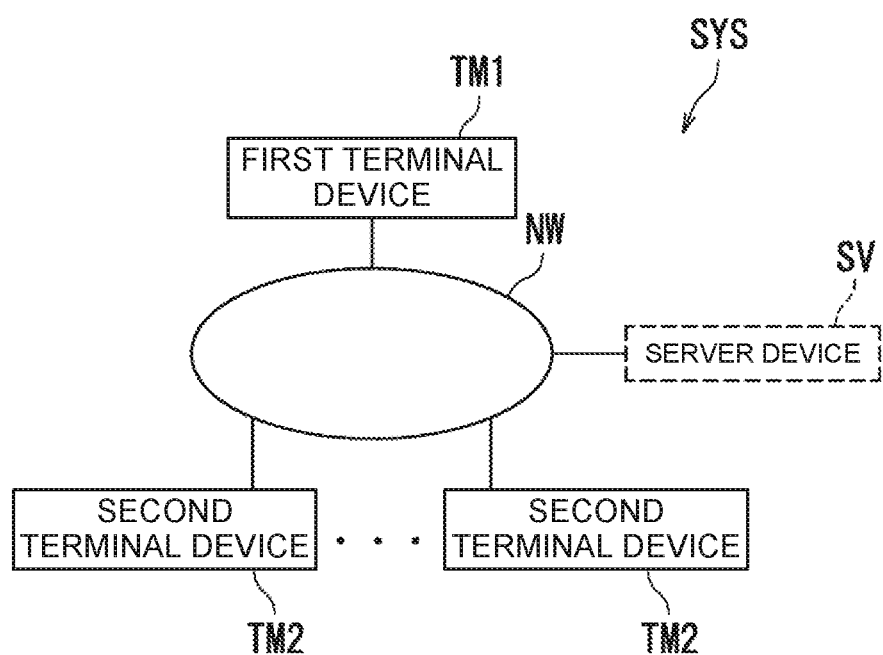
FIG. 1 is a diagram showing a two-way communication support system according to a first embodiment of the present disclosure.

Embodiments of the present disclosure will be described below with reference to drawings. In the drawings, the same or corresponding parts are identified with the same reference signs, and thus the description thereof is not repeated.

First Embodiment

A two-way communication support system SYS according to a first embodiment of the present disclosure will be described with reference to FIGS. 1 to 11.

FIG. 1 is a diagram showing the two-way communication support system SYS. As shown in FIG. 1, the two-way communication support system SYS includes a first terminal device TM1 and at least one second terminal device TM2. In the example of FIG. 1, the two-way communication support system SYS includes a plurality of second terminal devices TM2. The two-way communication support system SYS supports two-way communication between the first terminal device TM1 and the second terminal devices TM2. For example, the two-way communication support system SYS supports two-way communication between the first terminal device TM1 and the second terminal devices TM2 in an online conference, an online seminar or an online live. The online conference is, for example, a videoconference or a web conference.

The first terminal device TM1 and the second terminal devices TM2 are connected to a network NW, and communicate with each other through the network NW. Examples of the network NW include the Internet, a LAN (Local Area Network) and a public telephone network.

In the following description, the user of the first terminal device TM1 is referred to as the "first user U1", and the user of the second terminal device TM2 is referred to as the "second user U2". The first user U1 is present on a side where the first terminal device TM1 is arranged. The second user U2 is present on a side where the second terminal device TM2 is arranged. For ease of understanding, an example where the first user U1 is a "speaker (speaking person)" or a "sender" and the second user U2 is a "listener" or a "viewer" will be described.

The first terminal device TM1 transmits first state data (hereinafter referred to as the "first state data D10") to the second terminal device TM2. The first state data D10 is data which is changed according to the state of the first user U1.

The second terminal device TM2 receives the first state data D10 from the first terminal device TM1. Then, the second terminal device TM2 outputs an image and a voice indicated by the first state data D10.

The second terminal device TM2 transmits second state data (hereinafter referred to as the "second state data D20") to the first terminal device TM1. The second state data D20 is data which is changed according to the state of the second user U2.

The first terminal device TM1 receives the second state data D20 from the second terminal device TM2. Then, the first terminal device TM1 outputs an image and a voice indicated by the second state data D20.

Figure 2:
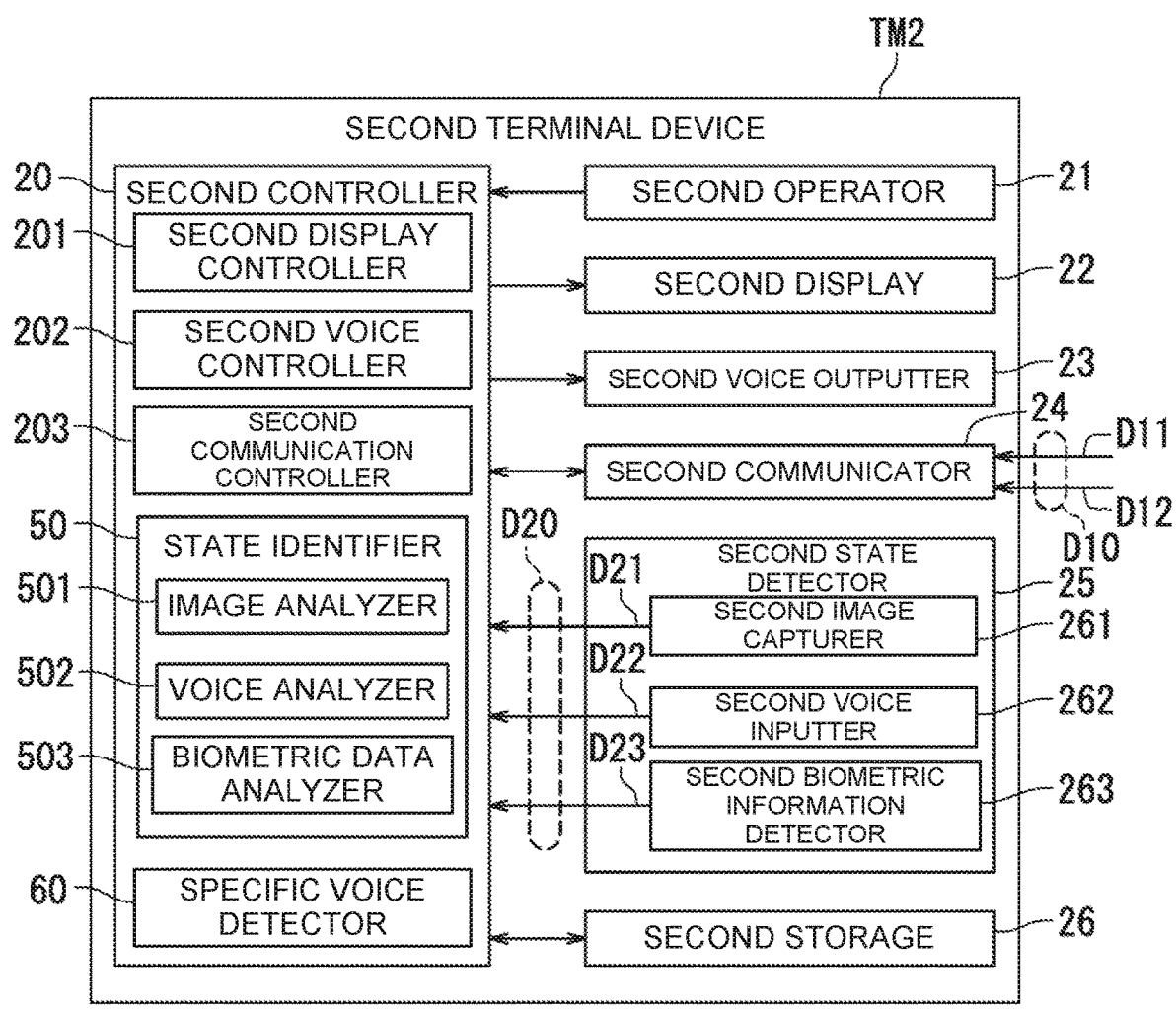
FIG. 2 is a diagram showing a second terminal device according to the first embodiment.

FIG. 2 is a diagram showing the second terminal device TM2 according to the first embodiment. As shown in FIG. 2, the second terminal device TM2 includes a second controller 20, a second operator 21, a second display 22, a second voice outputter 23, a second communicator 24, a second state detector 25 and a second storage 26. The second controller 20 includes a second display controller 201, a second voice controller 202, a second communication controller 203, a state identifier 50 and a specific voice detector 60. The state identifier 50 includes an image analyzer 501, a voice analyzer 502 and a biometric data analyzer 503.

The second controller 20 controls the second. operator 21, the second display 22, the second voice outputter 23, the second communicator 24, the second state detector 25 and the second storage 26. The second controller 20 includes a processor like a CPU (Central Processing Unit).

The second operator 21 receives an operation from the second user U2. The second operator 21 includes, for example, a keyboard and a mouse. The second operator 21 may include a touch screen. In this case, the touch screen is arranged to be overlaid on the second display 22.

The second display 22 displays various types of information. The second display 22 is, for example, a liquid crystal display or an organic electroluminescence display. The size of the second display 22 is not particularly limited, and, for example, the size may be suitable to be seen by one second user U2 or a small number of second users U2 or may be suitable to be seen by a large number of second users U2.

The second voice outputter 23 outputs a voice. The second voice outputter 23 includes, for example, a speaker.

The second communicator 24 is a communication device, and includes, for example, a network interface controller (NIC) which performs communication according to a predetermined communication protocol. The predetermined communication protocol is, for example, a TCP/IP (Transmission Control Protocol/Internet Protocol) Protocol Suite (that is, the Internet Protocol Suite). The second communicator 24 is connected to the network NW by wired or wireless connection.

The second state detector 25 detects the state of the second user U2. Then, the second state detector 25 outputs, to the second controller 20, the second state data D20 indicating the state of the second user U2. The second state data D20 is changed according to the state of the second user U2. The second state data D20 includes image data D21, voice data D22 and biometric data D23.

Specifically, the second state detector 25 includes a second image capturer 261, a second voice inputter 262 and a second biometric information detector 263.

The second image capturer 261 captures an image of the second user U2 and outputs, to the second controller 20, the image data D21 indicating the captured image which includes an image of the second user U2. The captured image includes a face image of the second user U2. The image indicated by the image data D21 is changed according to the state of the second user U2. For example, the face image indicates content corresponding to the facial expression of the second user U2. The second image capturer 261 includes, for example, a camera.

The voice of the second user U2 is input to the second voice inputter 262. Then, the second voice inputter 262 outputs, to the second controller 20, the voice data D22 indicating the voice of the second user U2. The voice based on the voice data D22 is changed according to the state of the second user U2. For example, the voice indicates content corresponding to the spoken content of the second user U2 and the sound volume of speaking. The second voice inputter 262 includes, for example, a microphone and an AD converter.

The second biometric information detector 263 detects biometric information of the second user U2, and outputs, to the second controller 20, the biometric data D23 indicating the biometric information. The biometric information is, for example, a body temperature, a pulse or a blood pressure. Hence, the second biometric information detector 263 includes, for example, a thermometer, a pulse rate monitor or a sphygmomanometer. The second biometric information detector 263 is installed in, for example, a smart watch. The biometric information indicated by the biometric data D23 is changed according to the state of the second user U2.

The second storage 26 includes a storage device, and stores data and computer programs. Specifically, the second storage 26 includes a main storage device such as a semiconductor memory and an auxiliary storage device such as a semiconductor memory, a solid-state drive and/or a hard disk drive. The second storage 26 may include a removable medium. The second storage 26 corresponds to an example of a non-transitory computer-readable storage medium.

The processor of the second controller 20 executes the computer programs stored in the storage device of the second storage 26 to function as the second display controller 201, the second voice controller 202, the second communication controller 203, the state identifier 50 and the specific voice detector 60.

The second display controller 201 controls the second display 22. The second voice controller 202 controls the second voice outputter 23. The second voice controller 202 mutes the voice based on the voice data D22 of the second user U2 according to a mute instruction received from the second user U2 through an operator 61.

The second communication controller 203 controls the second communicator 24. The second communication controller 203 in the second terminal device TM2 corresponds to an example of an "output controller" in the present disclosure.

The second communication controller 203 controls the second communicator 24 such that the second communicator 24 transmits the second state data D20 to the first terminal device TM1. Consequently, the second communicator 24 transmits the second state data D20 to the first terminal device TM1. Specifically, the second communicator 24 transmits the image data D21 of the second user U2 to the first terminal device TM1. When the voice of the second user U2 is not muted, the second communicator 24 transmits the voice data D22 of the second user U2 to the first terminal device TM1.

On the other hand, the second communicator 24 receives the first state data D10 from the first terminal device TM1. Specifically, the second communicator 24 receives the image data D11 of the first user U1 from the first terminal device TM1. Then, the second display controller 201 controls the second display 22 such that the second display 22 displays an image based on the image data D11 of the first user U1. Consequently, the second display 22 displays the image of the first user U1.

The second communicator 24 receives the voice data D12 of the first user U1 from the first terminal device TM1. Then, the second voice controller 202 controls the second voice outputter 23 such that the second voice outputter 23 outputs a voice based on the voice data D12 of the first user U1. Consequently, the second voice outputter 23 outputs the voice of the first user U1.

The state identifier 50 analyzes the second state data D20 which is changed according to the state of the second user U2 so as to identify the state of the second user U2. The state of the second user U2 refers to a state which can be identified by analyzing at least one of the face, the voice and the biometric information of the second user U2. The state of the second user U2 is, for example, the reaction of the second user U2. The reaction of the second user U2 is, for example, the reaction of the second user U2 to the speaking of the first user U1. The "reaction" is, for example, a state where the second user U2 laughs, a state where the second user U2 is angry, a state where the second user U2 makes a positive reaction, a state where the second user U2 makes a negative reaction or a state where the second user U2 makes no reaction.

The second communication controller 203 transmits, through the second communicator 24, to the first terminal device TM1, analysis information (hereinafter referred to as the "analysis information AN2") indicating the result of the identification of the state of the second user U2 performed by the state identifier 50, and thereby causes the first terminal device TM1 (the first display 12 of FIG. 3) to display the analysis information AN2. In other words, the second communication controller 203 causes the first terminal device TM1 (the first display 12 of FIG. 3) to output the analysis information AN2 indicating the result of the identification of the state of the second user U2 performed by the state identifier 50. Hence, in the first embodiment, the first user U1 serving as the speaker sees the analysis information AN2 in the first terminal device TM1 to be able to easily recognize the state of the second user U2 serving as the listener (for example, the reaction of the second user U2). The reason why the first user U1 can easily recognize the state of the second user U2 is that the analysis information AN2 indicates not the image itself and the voice itself of the second user U2 but the result of the identification of the state of the second user U2 (that is, the result of interpretation of the state of the second user U2).

Preferably, when the voice based on the voice data D22 of the second user U2 is muted, the state identifier 50 identifies the state of the second user U2. Then, when the voice based on the voice data D22 of the second user U2 is muted, the second communication controller 203 transmits, through the second communicator 24, to the first terminal device TM1, the analysis information AN2 indicating the result of the identification performed by the state identifier 50, and thereby causes the first terminal device TM1 (the first display 12 of FIG. 3) to display the analysis information AN2. In other words, when the voice based on the voice data D22 of the second user U2 is muted, the second communication controller 203 causes the first terminal device TM1 (the first display 12 of FIG. 3) to output the analysis information AN2 indicating the result of the identification performed by the state identifier 50.

In the preferred example described above, both the first user U1 serving as the speaker and the second user U2 serving as the listener have advantages.

For example, there is a case where the second user U2 serving as the listener mutes the voice so that the voice of the second user U2 is not transmitted to the first user U1 serving as the speaker. This is because the voice of the listener is prevented from interfering with the speaking of the speaker. In this case, when the voice of the second user U2 is muted, the first user U1 serving as the speaker may have difficulty recognizing, only with video, the reaction of the second user U2 serving as the listener.

Hence, in the preferred example described above, when the voice of the second user U2 is muted, the analysis information AN2 indicating the result of the identification of the state of the second user U2 serving as the listener is output (displayed) to the first terminal device TM1 of the first user U1 serving as the speaker, and thus even when the voice of the second user U2 is muted, the first user U1 can easily recognize the state of the second user U2 (for example, the reaction of the second user U2).

On the other hand, it is burdensome for the second user U2 serving as the listener to perform, as necessary, an operation of releasing the muting only in order to make a simple response (for example, "yes" or "no"). However, in the preferred example described above, while the voice of the second user U2 is being muted, the state of the second user U2 is transmitted to the first user U1. Hence, the second user U2 is not required to perform the operation of releasing the muting, and thus the bothersome state of the second user U2 can be reduced.

Specifically, the second state data D20 output by the second state detector 25 includes the image data D21 generated by capturing an image of the face of the second user U2. The image analyzer 501 of the state identifier 50 analyzes the image data D21 of the second user U2 to identify the state of the second user U2 indicated by the facial expression of the face of the second user U2. Hence, it is possible to accurately identify the state of the second user U2 by the image analysis.

For example, the image analyzer 501 recognizes a face image of the second user U2 from the image data D21. In this case, as a face recognition algorithm, for example, an inherent face using a main component analysis, a linear discriminant analysis, elastic bunch graph matching, Hidden Markov Model or dynamic link matching performed by neuron motivation can be adopted. Then, the image analyzer 501 analyzes the face image to identify the facial expression of the face of the second user U2. Specifically, the image analyzer 501 extracts the amount of characteristic from the face image and analyzes the amount of characteristic to identify the facial expression of the face of the second user U2. Examples of the amount of characteristic include eyebrows, eyes and a mouth. In this case, the image analyzer 501 performs pattern matching based on the amount of characteristic to identify the facial expression of the face of the second user U2.

For example, the image analyzer 501 analyzes the face image to identify which one of a "laughing state", an "angry state" and an "expressionless state" the state of the second user U2 is.

The image analyzer 501 outputs the analysis information AN2 indicating the state of the second user U2 identified with the facial expression of the face of the second user U2. In the following description, the analysis information AN2 obtained by the image analyzer 501 may be referred to as the "analysis information AN21".

Then, the second communication controller 203 transmits, through the second communicator 24, to the first terminal device TM1, the analysis information AN21 indicating the result of the identification of the state of the second user U2 performed by the image analyzer 501, and thereby causes the first terminal device TM1 (the first display 12 of FIG. 3) to display the analysis information AN21. Hence, in the first embodiment, the first user U1 (speaker) sees the analysis information AN21 in the first terminal device TM1 to be able to easily recognize the state of the second user U2 (listener) based on the image analysis.

The second state data D20 output by the state identifier 50 includes the voice data D22 generated by inputting the voice of the second user U2. The voice analyzer 502 of the state identifier 50 analyzes the voice data D22 of the second user U2 to identify the state of the second user U2 indicated by the voice of the second user U2. Hence, it is possible to accurately identify the state of the second user U2 by the voice analysis.

The voice analysis includes, for example, recognition processing of a sound volume level and voice recognition processing. In this case, as a voice recognition algorithm, for example, voice recognition using Hidden Markov Model, voice recognition using a statistical method or voice recognition using a dynamic time warping method can be adopted.

For example, the voice analyzer 502 analyzes the voice of the second user U2 to identify which one of a "laughing state", an "angry state" and a "silent state" the state of the second user U2 is. In this case, for example, the second storage 26 stores various types of voice patterns indicating various types of states of people. Then, the voice analyzer 502 performs pattern matching on the voice of the second user U2 to identify the state of the second user U2.

For example, the voice analyzer 502 analyzes the voice of the second user U2 to identify the degree of the state of the second user U2. In this case, for example, the voice analyzer 502 identifies, based on the sound volume level, the degree of the "laughing state", the degree of the "angry state" or the degree of the "silent state".

The voice analyzer 502 outputs the analysis information AN2 indicating the state of the second user U2 identified with the voice of the second user U2. In the following description, the analysis information AN2 obtained by the voice analyzer 502 may be referred to as the "analysis information AN22".

Then, the second communication controller 203 transmits, through the second communicator 24, to the first terminal device TM1, the analysis information AN22 indicating the result of the identification of the state of the second user U2 performed by the voice analyzer 502, and thereby causes the first terminal device TM1 (the first display 12 of FIG. 3) to display the analysis information AN22. Hence, in the first embodiment, the first user U1 (speaker) sees the analysis information AN22 in the first terminal device TM1 to be able to easily recognize the state of the second user U2 (listener) based on the voice analysis.

On the other hand, the first state data D10 received by the second communicator 24 from the first terminal device TM1 includes the voice data D12 generated by inputting the voice of the first user U1. Then, the specific voice detector 60 analyzes the voice data D12 of the first user U1 to detect a voice indicating a question from the first user U1. The voice analysis includes, for example, voice recognition processing. In this case, as a voice recognition algorithm, for example, voice recognition using Hidden Markov Model, voice recognition using a statistical method or voice recognition using a dynamic time warping method can be adopted. Furthermore, in this case, for example, the second storage 26 stores voice patterns of people indicating questions. Then, the voice analyzer 502 performs pattern matching on the voice of the first user U1 to detect the voice indicating the question from the first user U1.

Then, when the voice indicating the question from the first user U1 is detected, the voice analyzer 502 analyzes the voice data D22 of the second user U2 to distinguish the content of the reaction of the second user U2 to the question of the first user U1.

For example, the voice analyzer 502 analyzes the voice data D22 of the second user U2 to distinguish which one of a positive reaction (for example, a voice indicating "yes"), a negative reaction (for example, a voice indicating "no") and no reaction (for example, "no voice") the reaction of the second user U2 is. In this case, for example, the second storage 26 stores various types of voice patterns indicating reactions of people to questions. Then, the voice analyzer 502 performs pattern matching on the voice of the second user U2 to distinguish the content of the reaction of the second user U2.

Then, the second communication controller 203 transmits, through the second communicator 24, to the first terminal device TM1, the analysis information AN22 including the result of the distinguishing of the content of the reaction of the second user U2, and thereby causes the first terminal device TM1 (the first display 12 of FIG. 3) to display the analysis information AN22. In other words, the second communication controller 203 causes the first terminal device TM1 to output the analysis information AN22 including the result of the distinguishing of the content of the reaction of the second user U2.

Hence, in the first embodiment, the first user U1 sees the analysis information AN22 in the first terminal device TM1 to be able to easily recognize the content of the reaction of the second user U2 to the question.

The second state data D20 output by the state identifier 50 includes the biometric data D23 indicating the biometric information of the second user U2. The biometric data analyzer 503 of the state identifier 50 analyzes the biometric data D23 of the second user U2 to identify the state of the second user U2 indicated by the biometric information of the second user U2. Hence, it is possible to accurately identify the state of the second user U2 with the biometric information.

The biometric data analyzer 503 outputs the analysis information AN2 which is identified with the biometric information of the second user U2 and which indicates the state of the second user U2. In the following description, the analysis information AN2 obtained by the biometric data analyzer 503 may be referred to as the "analysis information AN23".

Then, the second communication controller 203 transmits, through the second communicator 24, to the first terminal device TM1, the analysis information AN23 indicating the result of the identification of the state of the second user U2 performed by the biometric data analyzer 503, and thereby causes the first terminal device TM1 (the first display 12 of FIG. 3) to display the analysis information AN23. Hence, in the first embodiment, the first user U1 (speaker) sees the analysis information AN23 in the first terminal device TM1 to be able to easily recognize the state of the second user U2 (listener) based on the biometric information.

Figure 3:
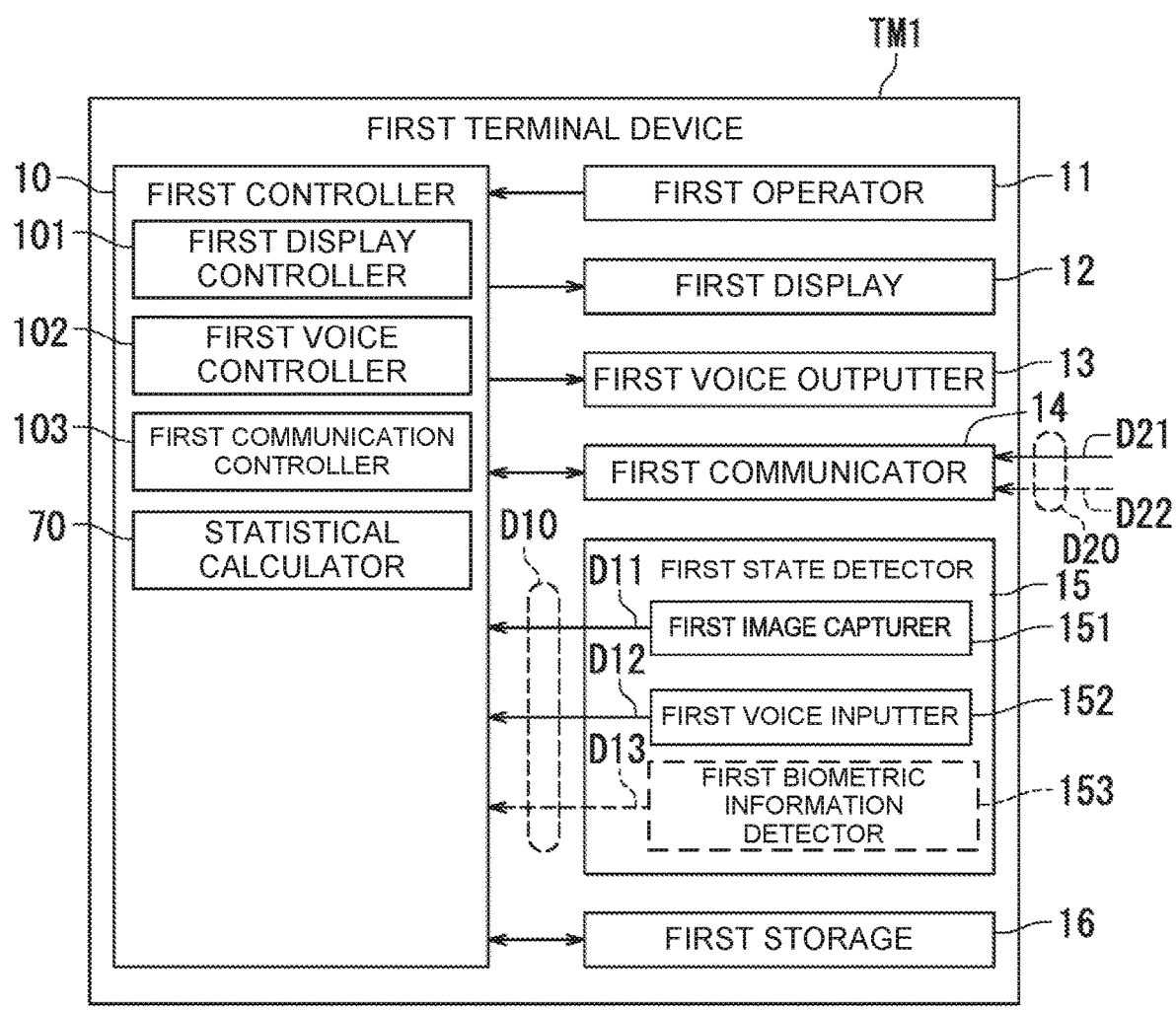
FIG. 3 is a diagram showing a first terminal device according to the first embodiment.

The first terminal device TM1 will then be described with reference to FIG. 3. FIG. 3 is a diagram showing the first terminal device TM1. As shown in FIG. 3, the first terminal device TM1 includes a first controller 10, a first operator 11, a first display 12, a first voice outputter 13, a first communicator 14, a first state detector 15 and a first storage 16. The first controller 10 includes a first display controller 101, a first voice controller 102, a first communication controller 103 and a statistics calculator 70.

The first controller 10 controls the first operator 11, the first display 12, the first voice outputter 13, the first communicator 14, the first state detector 15 and the first storage 16. The hardware configuration of the first controller 10 is the same as the hardware configuration of the second controller 20 of FIG. 2.

The first operator 11 receives an operation from the first user U1. The hardware configuration of the first operator 11 is the same as the hardware configuration of the second operator 21 of FIG. 2.

The first display 12 displays various types of information. The hardware configuration of the first display 12 is the same as the hardware configuration of the second display 22 of FIG. 2.

The first voice outputter 13 outputs a voice. The hardware configuration of the first voice outputter 13 is the same as the hardware configuration of the second voice outputter 23 of FIG. 2.

The first communicator 14 is a communication device, and includes, for example, a network interface controller (NIC) which performs communication according to a predetermined communication protocol. The first communicator 14 is connected to the network NW by wired or wireless connection. The hardware configuration of the first communicator 14 is the same as the hardware configuration of the second communicator 24 of FIG. 2.

The first state detector 15 detects the state of the first user U1. Then, the first state detector 15 outputs the first state data D10 indicating the state of the first user U1 to the first controller 10. The first state data D10 is changed according to the state of the first user U1. The first state data D10 includes the image data D11, the voice data D12 and biometric data D13.

Specifically, the first state detector 15 includes a first image capturer 151, a first voice inputter 152 and a first biometric information detector 153.

The first image capturer 151 captures an image of the first user U1 and outputs, to the first controller 10, the image data D11 indicating the captured image which includes an image of the first user U1. The captured image includes a face image of the first user U1. The image indicated by the image data D11 is changed according to the state of the first user U1. For example, the face image indicates content corresponding to the facial expression of the first user U1. The first image capturer 151 includes, for example, a camera.

The voice of the first user U1 is input to the first voice inputter 152. Then, the first voice inputter 152 outputs, to the first controller 10, the voice data D12 indicating the voice of the first user U1. The voice based on the voice data D12 is changed according to the state of the first user U1. For example, the voice indicates content corresponding to the spoken content of the first user U1 and the sound volume of speaking. The first voice inputter 152 includes, for example, a microphone and an AD converter.

The first biometric information detector 153 detects biometric information of the first user U1, and outputs, to the first controller 10, the biometric data D13 indicating the biometric information. The biometric information is, for example, a body temperature, a pulse or a blood pressure. Hence, the first biometric information detector 153 includes, for example, a thermometer, a pulse rate monitor or a sphygmomanometer. The first biometric information detector 153 is installed in, for example, a smart watch. The biometric information indicated by the biometric data D13 is changed according to the state of the first user U1.

The first storage 16 includes a storage device, and stores data and computer programs. The first storage 16 corresponds to an example of the non-transitory computer-readable storage medium. The hardware configuration of the first storage 16 is the same as the hardware configuration of the second storage 26 of FIG. 2.

The processor of the first controller 10 executes the computer programs stored in the storage device of the first storage 16 to function as the first display controller 101, the first voice controller 102, the first communication controller 103 and the statistics calculator 70.

The first display controller 101 controls the first display 12. The first voice controller 102 controls the first voice outputter 13. The configuration of the first voice outputter 13 is the same as the configuration of the second voice outputter 23 of FIG. 2.

The first display controller 101 in the first terminal device TM1 corresponds to an example of the "output controller" in the present disclosure.

The first communication controller 103 controls the first communicator 14. Specifically, the first communication controller 103 controls the first communicator 14 such that the first communicator 14 transmits the first state data D10 to the second terminal device TM2. Consequently, the first communicator 14 transmits the first state data D10 to the second terminal device TM2. Specifically, the first communicator 14 transmits the image data D11 and the voice data D12 of the first user U1 to the second terminal device TM2.

On the other hand, the first communicator 14 receives the second state data D20 from the second terminal device TM2. Specifically, the first communicator 14 receives the image data D21 of the second user U2 from the second terminal device TM2. Then, the first display controller 101 controls the first display 12 such that the first display 12 displays an image based on the image data D21 of the second user U2. Consequently, the first display 12 displays the image of the second user U2.

When the voice of the second user U2 is not muted, the first communicator 14 receives the voice data D22 of the second user U2 from the second terminal device TM2. Then, when the voice of the second user U2 is not muted, the first voice controller 102 controls the first voice outputter 13 such that the first voice outputter 13 outputs a voice based on the voice data D22 of the second user U2. Consequently, when the voice of the second user U2 is not muted, the first voice outputter 13 outputs the voice of the second user U2.

The first communicator 14 receives a plurality of pieces of analysis information AN2 from a plurality of second terminal devices TM2. The pieces of analysis information AN2 respectively correspond to a plurality of second users U2. Each of the pieces of analysis information AN2 indicates the result of the identification of the state of the corresponding second user U2. The analysis information AN2 obtained by the state identifier 50 of the second terminal device TM2 includes the analysis information AN21 obtained by the image analyzer 501 of the second terminal device TM2, the analysis information AN22 obtained by the voice analyzer 502 of the second terminal device TM2 and the analysis information AN23 obtained by the biometric data analyzer 503 of the second terminal device TM2.

Then, the first display controller 101 controls the first display 12 such that the pieces of analysis information AN2 are displayed. Consequently, the first display 12 displays the pieces of analysis information AN2. In other words, the first display controller 101 causes the first display 12 to output the pieces of analysis information AN2. Hence, in the first embodiment, the first user U1 serving as the speaker sees the analysis information AN2 on the first display 12 to be able to easily recognize the state of the second user U2 serving as the listener (for example, the reaction of the second user U2).

Preferably, the statistics calculator 70 calculates the statistics of the pieces of analysis information AN2 respectively indicating the results of the identification of the states of the second users U2. The statistics indicate the distribution, the tendency or the characteristic of the pieces of analysis information AN2 which constitute a collection. For example, the statistics indicate the distribution, the tendency or the characteristic of the contents of the reactions of the second users U2 to the speaking of the first user U1.

Then, the first display controller 101 causes the first display 12 to display statistics information (hereinafter referred to as the "statistics information ST") indicating the result of the statistics calculated by the statistics calculator 70. In other words, the first display controller 101 causes the first display 12 of the first terminal device TM1 to output the statistics information ST indicating the result of the statistics calculated by the statistics calculator 70. Hence, in the first embodiment, the first user U1 serving as the speaker sees the statistics information ST on the first display 12 to be able to intuitively recognize the states of the second users U2 serving as the listeners (for example, the reactions of the second users U2). For example, the statistics information ST indicates the distribution, the tendency or the characteristic of the contents of the reactions of the second users U2 to the speaking of the first user U1.

The first communication controller 103 transmits the statistics information ST indicating the result of the statistics calculated by the statistics calculator 70 to the second terminal device TM2 through the first communicator 14, and thereby causes the second terminal device TM2 (the second display 22) to display the statistics information ST. In other words, the first communication controller 103 causes the second terminal device TM2 (the second display 22) to output the statistics information ST indicating the result of the statistics calculated by the statistics calculator 70. Hence, in the first embodiment, the second user U2 serving as the listener sees the statistics information ST in the second terminal device TM2 to be able to intuitively recognize the states of the other second users U2 serving as the listeners (for example, the reactions of the other second users U2). In this case, the first communication controller 103 in the first terminal device TM1 corresponds to an example of the "output controller" in the present disclosure.

More preferably, the statistics calculator 70 calculates the statistics of the pieces of analysis information AN2 to produce a graph (hereinafter referred to as the "graph GP") which indicates the result of the statistics as the statistics information ST. Then, the first display controller 115 causes the first display 12 of the first terminal device TM1 to display the graph GP. Hence, in the first embodiment, the first user U1 serving as the speaker sees the graph GP on the first display 12 to be able to more intuitively recognize the states of the second users U2 serving as the listeners (for example, the reactions of the second users U2). For example, the graph GP indicates the distribution, the tendency or the characteristic of the contents of the reactions of the second users U2 to the speaking of the first user U1.

The first communication controller 103 transmits the graph GP indicating the result of the statistics of the pieces of analysis information AN2 to the second terminal device TM2 through the first communicator 14, and thereby causes the second terminal device TM2 (the second display 22) to display the graph GP. In other words, the first communication controller 103 causes the second terminal device TM2 (the second display 22) to output the graph GP indicating the result of the statistics of the pieces of analysis information AN2. Hence, in the first embodiment, the second user U2 serving as the listener sees the graph GP in the second terminal device TM2 to be able to more intuitively recognize the states of the other second users U2 serving as the listeners (for example, the reactions of the other second users U2). In this case, the first communication controller 103 in the first terminal device TM1 corresponds to an example of the "output controller" in the present disclosure.

The graph GP produced by the statistics calculator 70 will then be illustrated with reference to FIGS. 4 to 6.

Figure 4:
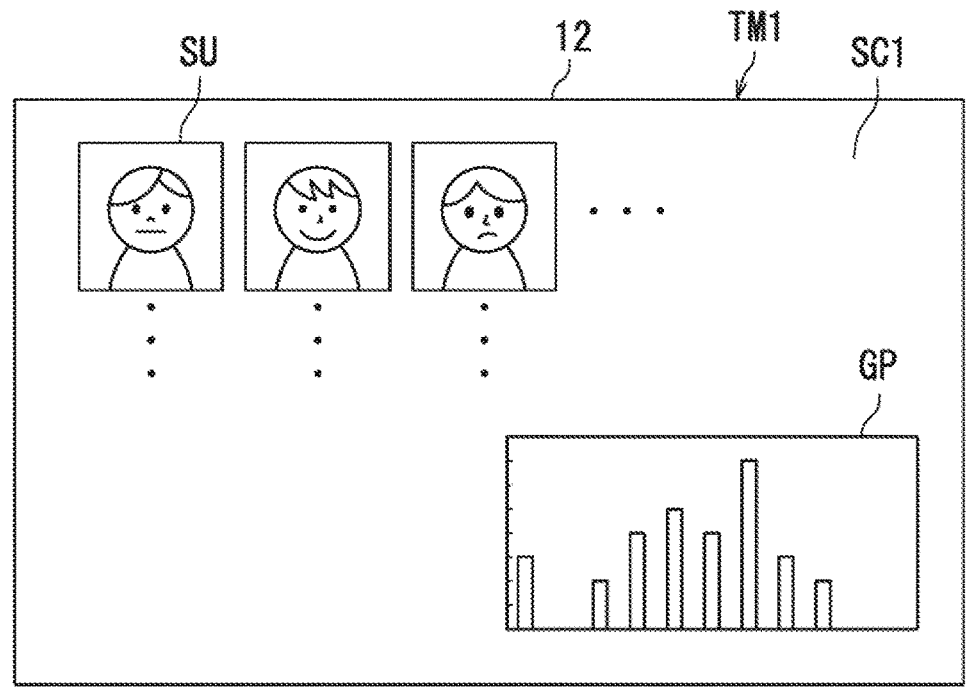
FIG. 4 is a diagram showing a screen displayed in the first terminal device according to the first embodiment.

FIG. 4 is a diagram showing a screen SC1 displayed in the first terminal device TM1. As shown in FIG. 4, the first display 12 of the first terminal device TM1 displays the screen SC1. The screen SC1 includes images SU of the second users U2 and the graph GP.

Figure 5:
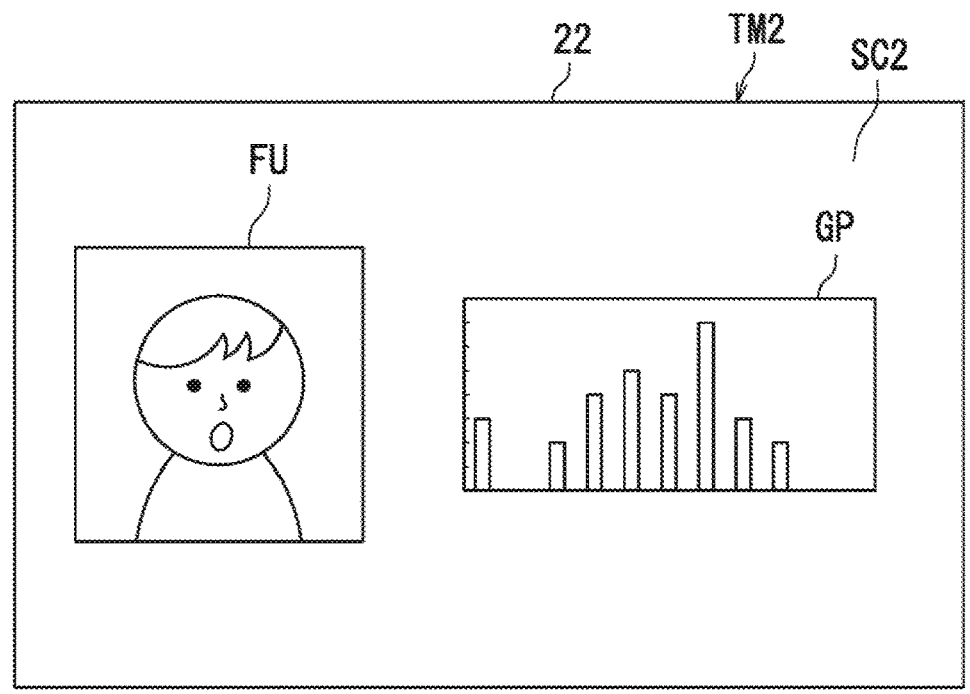
FIG. 5 is a diagram showing a screen displayed in the second terminal device according to the first embodiment.

FIG. 5 is a diagram showing a screen SC2 displayed in the second terminal device TM2. As shown in FIG. 5, the second display 22 of each of the second terminal devices TM2 displays the screen SC2. The screen SC2 includes an image FU of the first user U1 and the graph GP.

Figure 6:
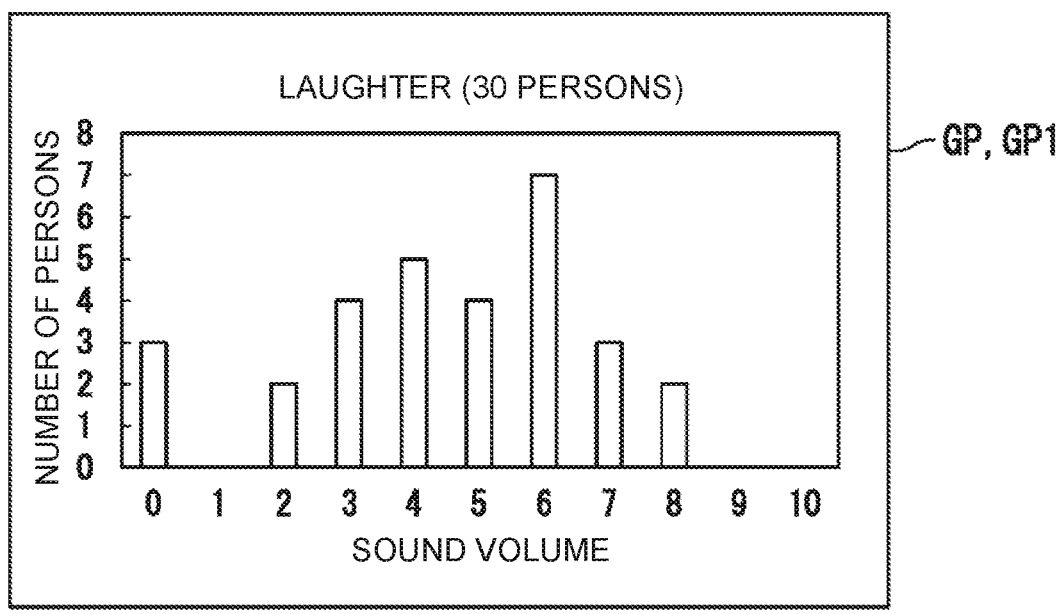
FIG. 6 is a diagram showing an example of a graph shown in FIGS. 4 and 5.

FIG. 6 is a diagram showing an example of the graph GP (hereinafter referred to as the "graph GP1") shown in FIGS. 4 and 5. As shown in FIG. 6, the graph GP1 shows a relationship between the sound volume of laughter of the second users U2 and the number of persons. In the graph GP1, a horizontal axis represents the sound volume of laughter and a vertical axis represents the number of second users U2 who issue each of sound volumes.

Figure 7:
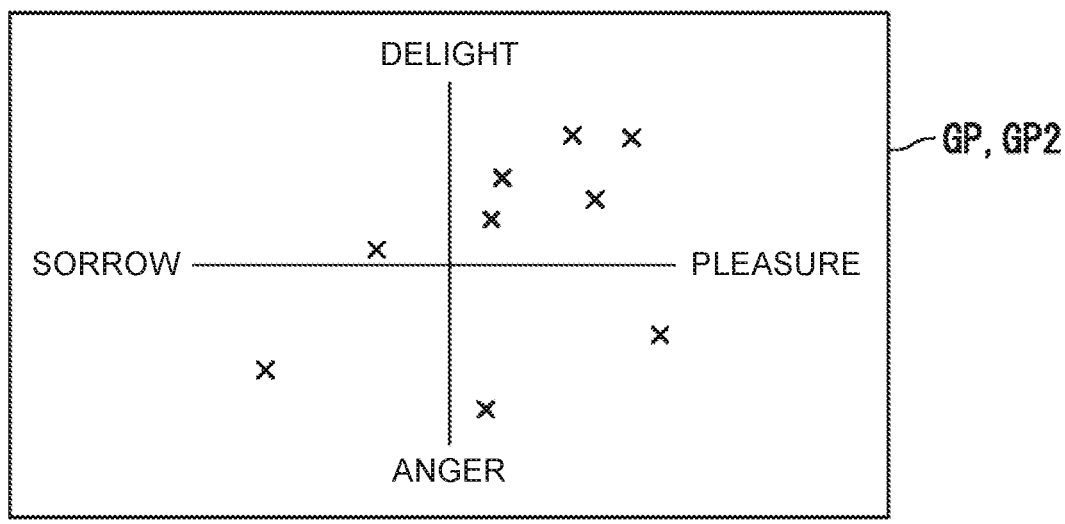
FIG. 7 is a diagram showing another example of the graph shown in FIGS. 4 and 5.

FIG. 7 is a diagram showing another example of the graph GP (hereinafter referred to as the "graph GP2") shown in FIGS. 4 and 5. As shown in FIG. 7, the graph GP2 indicates the distribution of delight, anger, sorrow and pleasure of the second users U2. A horizontal axis represents the degree of emotion from the state of "sorrow" to the state of "pleasure". A vertical axis represents the degree of emotion from the state of "delight" to the state of "anger".

Figure 8:
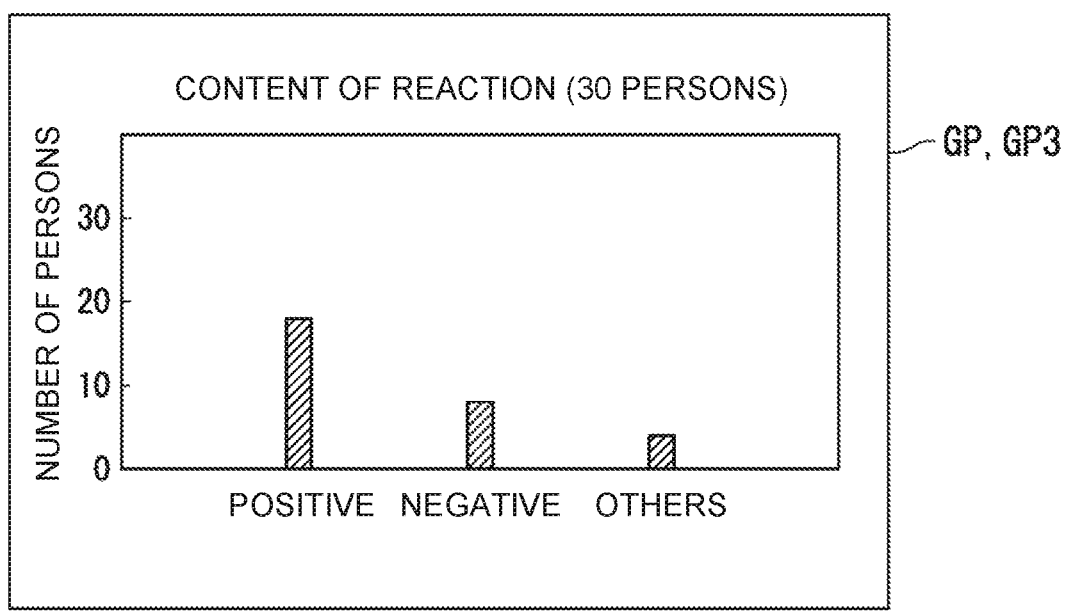
FIG. 8 is a diagram showing yet another example of the graph shown in FIGS. 4 and 5.

FIG. 8 is a diagram showing yet another example of the graph GP (hereinafter referred to as the "graph GP3") shown in FIGS. 4 and 5. As shown in FIG. 8, the graph GP3 indicates a relationship between the content of the reaction of the second users U2 to the speaking of the first user U1 and the number of persons. A horizontal axis represents the content of the reaction. In the horizontal axis, as the contents of the reactions, a "positive reaction" such as "yes", a "negative reaction" such as "no" and "others" such as "no reaction" are displayed. A vertical axis represents the number of second users U2 who produce the content of the reaction.

As described above with reference to FIGS. 4 to 8, in the first embodiment, the first user U1 serving as the speaker sees the graph GP on the first display 12 to be able to intuitively recognize the reactions of the second users U2 serving as the listeners.

The second user U2 serving as the listener sees the graph GP on the second display 22 to be able to intuitively recognize the reactions of the other second users U2 serving as the listeners.

Figure 9:
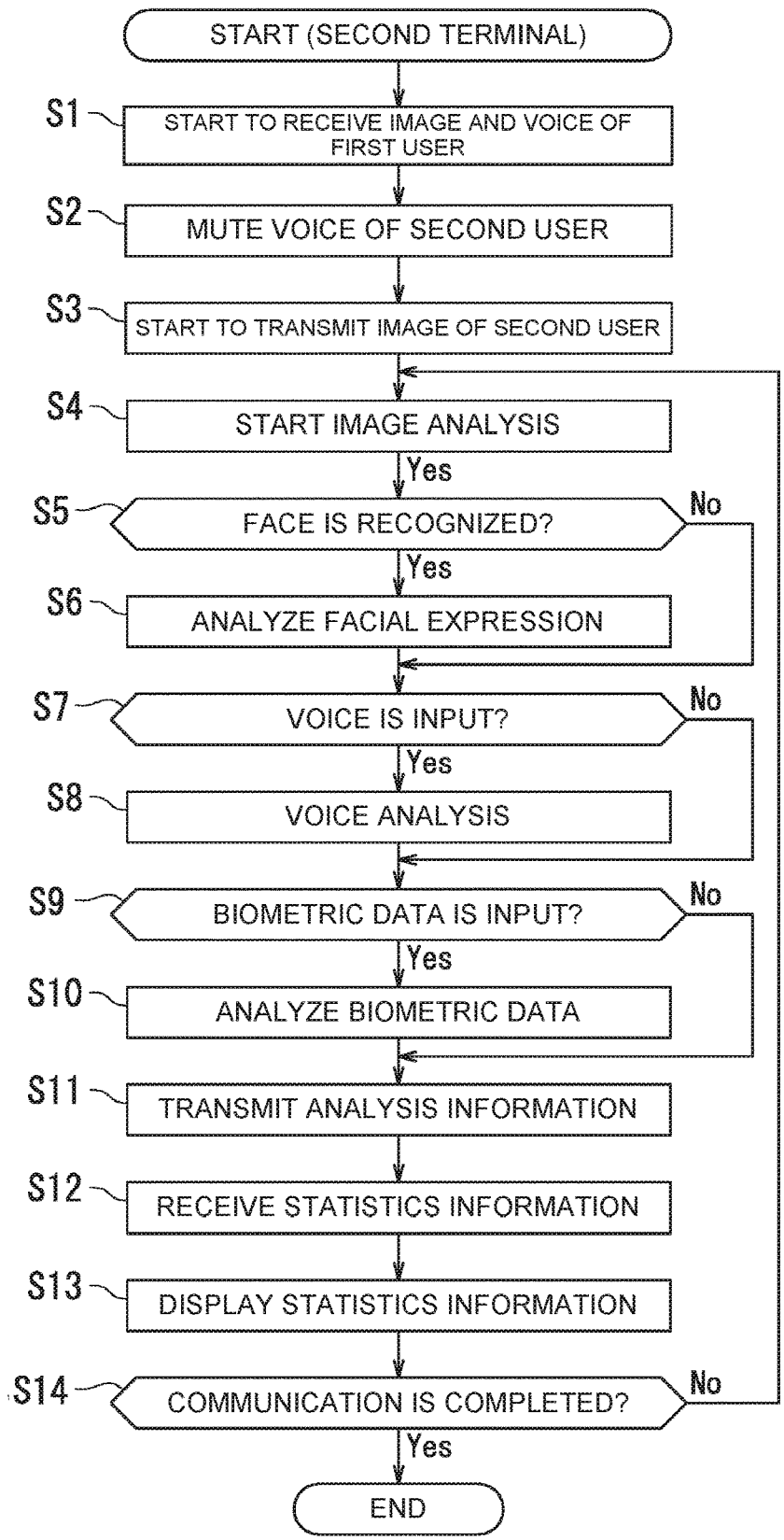
FIG. 9 is a flowchart showing the processing of the second terminal device according to the first embodiment.

The processing of the second terminal device TM2 will then be described with reference to FIGS. 2 and 9. FIG. 9 is a flowchart showing the processing of the second terminal device TM2. As shown in FIG. 9, the processing of the second terminal device TM2 includes steps S1 to S14. Specifically, the computer programs stored in the second storage 26 of the second terminal device TM2 instruct the second controller 20 of the second terminal device TM2 to perform the processing of steps S1 to S14.

As shown in FIGS. 2 and 9, in step S1, the second communication controller 203 first starts to receive the image data D11 and the voice data D12 of the first user U1 from the first terminal device TM1 through the second communicator 24. Then, the second display controller 201 causes the second display 22 to display the image based on the image data D11 of the first user U1. The second voice controller 202 causes the second voice outputter 23 to output the voice based on the voice data D12 of the first user U1.

Then, in step S2, the second voice controller 202 mutes the voice based on the voice data D22 of the second user U2 according to the mute instruction from the second user U2.

Then, in step S3, the second communication controller 203 starts to transmit the image data D21 of the second user U2 to the first terminal device TM1 through the second communicator 24.

Then, in step S4, the image analyzer 501 starts to perform image analysis on the image data D21 output by the second image capturer 261.

Then, in step S5, the image analyzer 501 determines whether or not a face image can be recognized from the image indicated by the image data D21.

When it is determined in step S5 that the face image cannot be recognized, the processing proceeds to step S7.

On the other hand, when it is determined in step S5 that the face image can be recognized, the processing proceeds to step S6.

Then, in step S6, the image analyzer 501 analyzes, based on the face image, the facial expression of the face of the second user U2. Then, the image analyzer 501 stores, in the second storage 26, the analysis information AN21 indicating the result of the analysis of the facial expression of the face of the second user U2. The analysis information AN21 indicates the result of the identification of the state of the second user U2 based on the image.

Then, in step S7, the voice analyzer 502 determines whether or not a voice is input to the second voice inputter 262.

When it is determined in step S7 that the voice is not input, the processing proceeds to step S9.

On the other hand, when it is determined in step S7 that the voice is input, the processing proceeds to step S8.

Then, in step S8, the voice analyzer 502 performs voice analysis on the voice data D22 indicating the voice input to the second voice inputter 262. Then, the voice analyzer 502 stores, in the second storage 26, the analysis information AN22 indicating the result of the analysis of the voice of the second user U2. The analysis information AN22 indicates the result of the identification of the state of the second user U2 based on the voice.

Then, in step S9, the biometric data analyzer 503 determines whether or not the biometric data D23 is input from the second biometric information detector 263.

When it is determined in step S9 that the biometric data D23 is not input, the processing proceeds to step S11.

On the other hand, when it is determined in step S9 that the biometric data D23 is input, the processing proceeds to step S10.

Then, in step S10, the biometric data analyzer 503 performs analysis processing on the biometric data D23. Then, the biometric data analyzer 503 stores, in the second storage 26, the analysis information AN23 indicating the result of the analysis of the biometric data D23 of the second user U2. The analysis information AN23 indicates the result of the identification of the state of the second user U2 based on the biometric information.

Then, in step S11, the second communication controller 203 transmits the analysis information AN2 to the first terminal device TM1 through the second communicator 24. The analysis information AN2 includes the analysis information AN21, the analysis information AN22 and the analysis information AN23.

Then, in step S12, the second communication controller 203 receives the statistics information ST from the first terminal device TM1 through the second communicator 24. The statistics information ST indicates the result of the statistics of the pieces of analysis information AN2 which respectively correspond to the second users U2. Specifically, the second communication controller 203 receives the graph GP as the statistics information ST from the first terminal device TM1 through the second communicator 24.

Then, in step S13, the second display controller 201 causes the second display 22 to display the statistics information ST. Specifically, the second display controller 201 causes the second display 22 to display the graph GP. In this case, the second display controller 201 in the second terminal device TM2 corresponds to an example of the "output controller" in the present disclosure.

Then, in step S14, the second communication controller 203 determines whether or not communication between the second terminal device TM2 and the first terminal device TM1 is completed.

When it is determined in step S14 that the communication is not completed, the processing proceeds to step S4.

On the other hand, when it is determined in step S14 that the communication is completed, the processing is completed.

Figure 10:
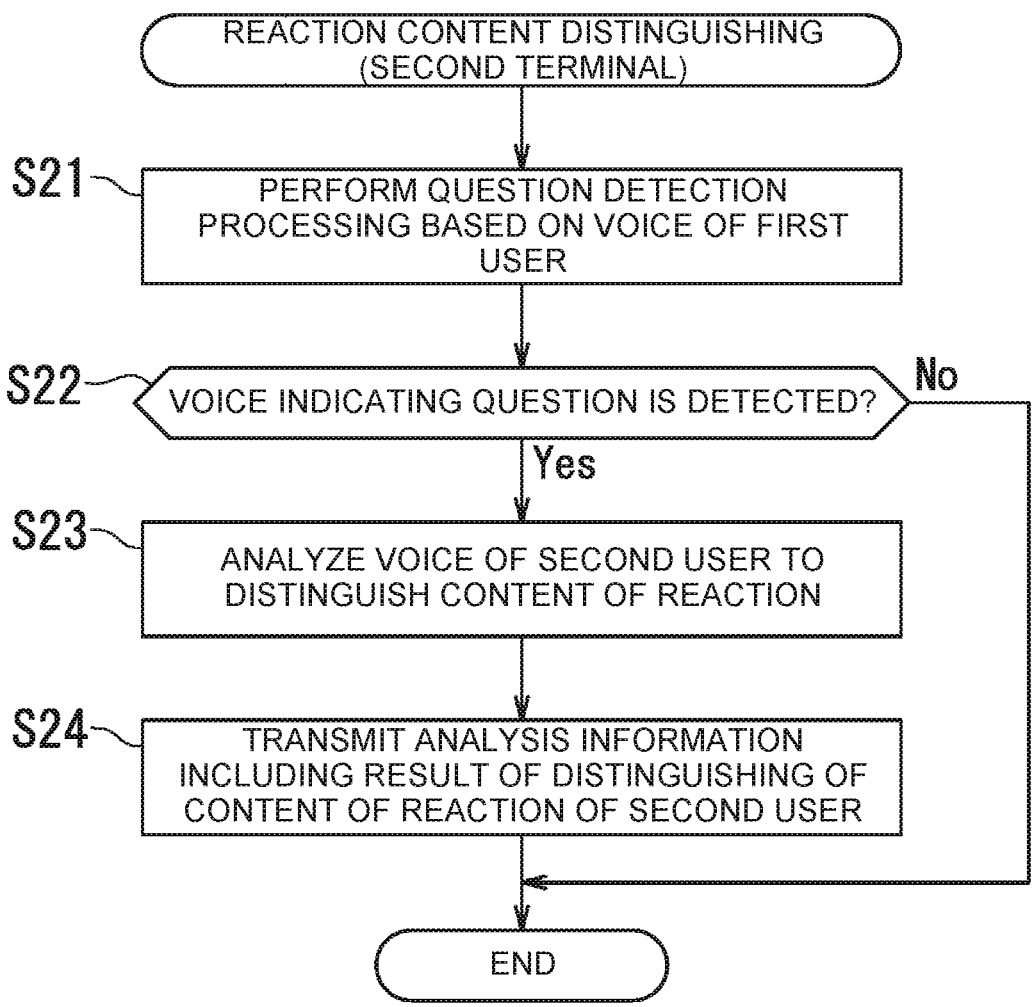
FIG. 10 is a flowchart showing the reaction content distinguishing processing of the second terminal device according to the first embodiment.

The reaction content distinguishing processing of the second terminal device TM2 will then be described with reference to FIGS. 2 and 10. FIG. 10 is a flowchart showing the reaction content distinguishing processing of the second terminal device TM2. As shown in FIG. 10, the reaction content distinguishing processing includes steps S21 to S24. Specifically, the computer programs stored in the second storage 26 of the second terminal device TM2 instruct the second controller 20 of the second terminal device TM2 to perform the processing of steps S21 to S24.

As shown in FIGS. 2 and 10, in step S21, the specific voice detector 60 first performs question detection processing based on the voice data D12 of the first user U1. The question detection processing refers to processing which analyzes the voice data D12 of the first user U1 to detect, from the voice data D12 of the first user U1, a voice of the first user U1 indicating a question.

Then, in step S22, the voice analyzer 502 determines whether or not the specific voice detector 60 detects the voice indicating the question.

When it is determined in step S22 that the voice indicating the question is not detected, the processing is completed.

On the other hand, when it is determined in step S22 that the voice indicating the question is detected, the processing proceeds to step S23.

Then, in step S23, the voice analyzer 502 analyzes the voice data D22 of the second user U2 to distinguish the content of the reaction of the second user U2 to the question. Then, the voice analyzer 502 stores, in the second storage 26, the analysis information AN22 including the result of the distinguishing of the content of the reaction of the second user U2.

Then, in step S24, the second communication controller 203 transmits the analysis information AN22 to the first terminal device TM1 through the second communicator 24. Then, the processing is completed.

Figure 11:
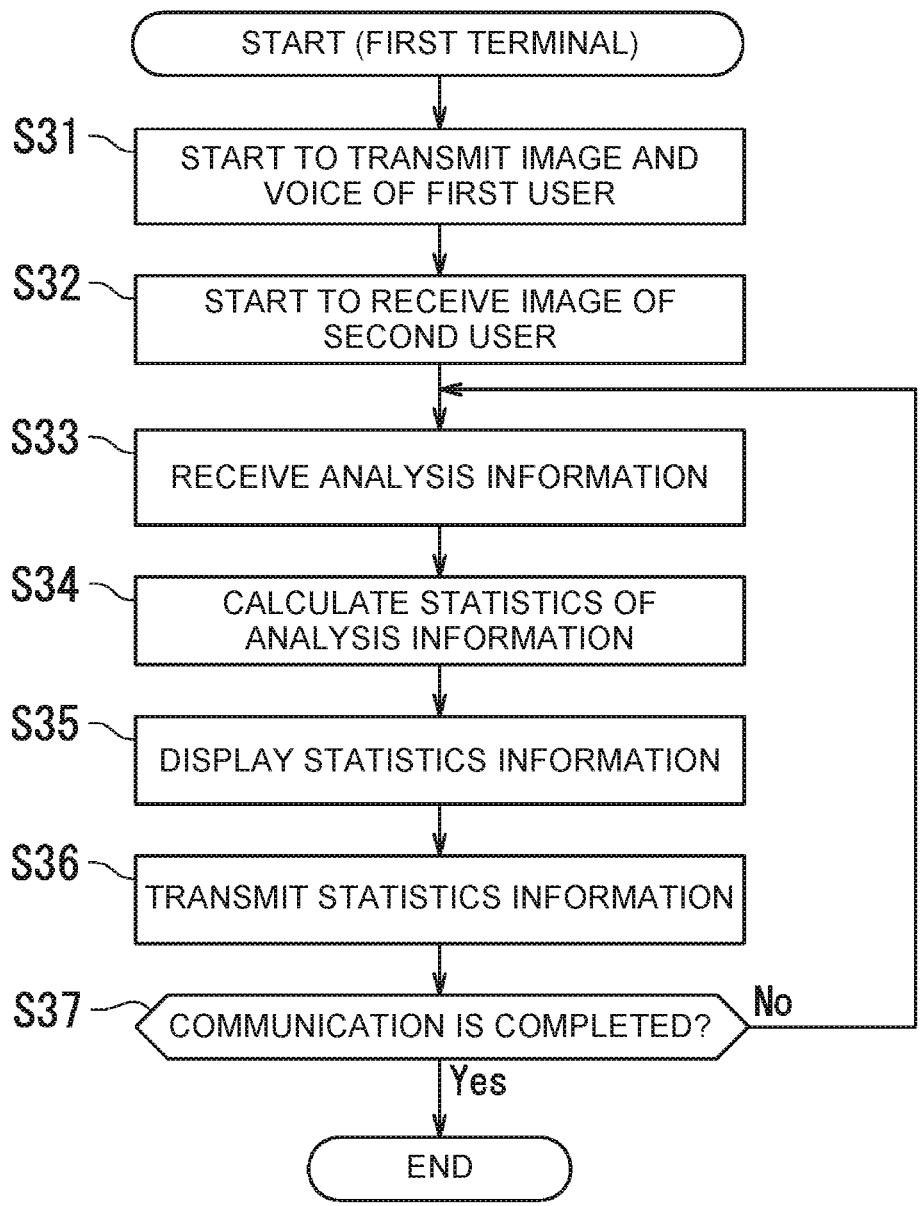
FIG. 11 is a flowchart showing the processing of the first terminal device according to the first embodiment.

The processing of the first terminal device TM1 will then be described with reference to FIGS. 3 and 11. FIG. 11 is a flowchart showing the processing of the first terminal device TM1. As shown in FIG. 11, the processing of the first terminal device TM1 includes steps S31 to S37. Specifically, the computer programs stored in the first storage 16 of the first terminal device TM1 instruct the first controller 10 of the first terminal device TM1 to perform the processing of steps S31 to S37.

As shown in FIGS. 3 and 11, in step S31, the first communication controller 103 first starts to transmit the image data D11 and the voice data D12 of the first user U1 to the second terminal devices TM2 through the first communicator 14.

Then, in step S32, the first, communication controller 103 starts to receive the image data D21 of the second users U2 from the second terminal devices TM2 through the first communicator 14. Then, the first display controller 101 causes the first display 12 to display images based on the image data D21 of the second users U2.

Then, in step S33, the first communication controller 103 receives the pieces of analysis information AN2 from the second terminal devices TM2 through the first communicator 14. The analysis information AN2 indicates the result of the identification of the state of the second user U2. The analysis information AN2 includes the analysis information AN21, the analysis information AN22 and the analysis information AN23.

Then, in step S34, the statistics calculator 70 calculates the statistics of the pieces of analysis information AN2 respectively indicating the results of the identification of the states of the second users U2, and thereby generates the statistics information ST indicating the result of the statistics. Specifically, the statistics calculator 70 produces the graph GP as the statistics information ST.

Then, in step S35, the first display controller 101 causes the first display 12 to display the statistics information ST. Specifically, the first display controller 101 causes the first display 12 to display the graph GP.

Then, in step S36, the first communication controller 103 transmits the statistics information ST to the second terminal devices TM2 through the first communicator 14. Specifically, the first communication controller 103 transmits the graph GP to the second terminal devices TM2 through the first communicator 14.

Then, in step S37, the first communication controller 103 determines whether or not communication between the first terminal device TM1 and the second terminal device TM2 is completed.

When it is determined in step S37 that the communication is not completed, the processing proceeds to step S33.

On the other hand, when it is determined in step S37 that the communication is completed, the processing is completed.

Second Embodiment

A two-way communication support system SYS according to a second embodiment of the present disclosure will then be described with reference to FIGS. 1 to 3, 12 and 13. In the two-way communication support system SYS according to the second embodiment, the second embodiment mainly differs from the first embodiment in that a server device SV shown in FIG. 1 includes the state identifier 50 of FIG. 2, the specific voice detector 60 of FIG. 2 and the statistics calculator 70 of FIG. 3. Differences between the second embodiment and the first embodiment will be mainly described below.

As shown in FIG. 1 in the second embodiment, the two-way communication support system SYS includes a first terminal device TM1, at least one second terminal device TM2 and the server device SV. The server device SV intervenes in communication between the first terminal device TM1 and the second terminal device TM2.

The configuration of the first terminal device TM1 according to the second embodiment is the same as the configuration of the first terminal device TM1 of FIG. 3. However, the first terminal device TM1 according to the second embodiment does not include the statistics calculator 70 of FIG. 3.

Furthermore, the configuration of the second terminal device TM2 according to the second embodiment is the same as the configuration of the second terminal device TM2 of FIG. 2. However, the second terminal device TM2 according to the second embodiment does not include the state identifier 50 and the specific voice detector 60 of FIG. 2.

Figure 12:
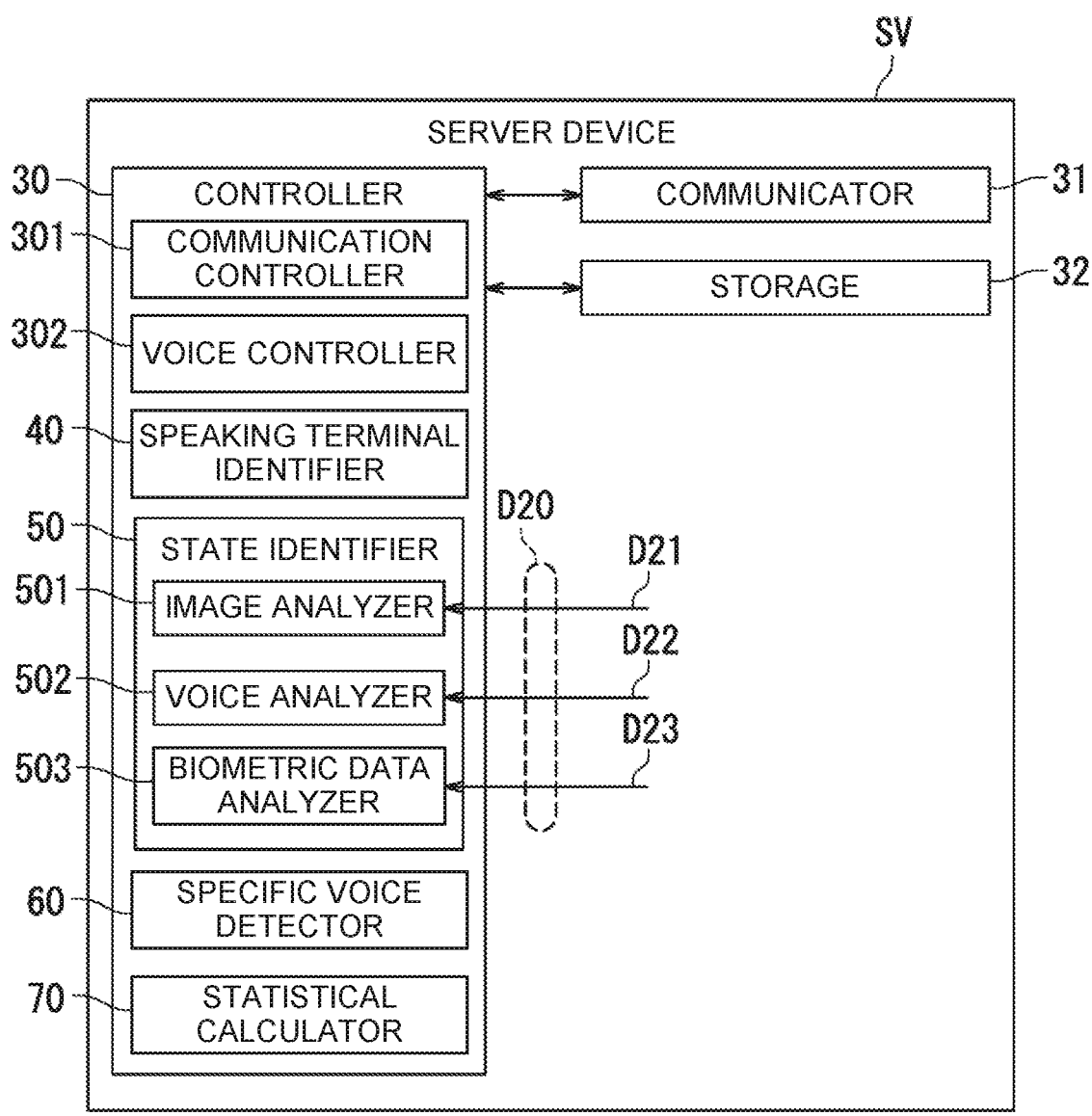
FIG. 12 is a diagram showing a server device according to a second embodiment of the present disclosure.

FIG. 12 is a diagram showing the server device SV according to the second embodiment of the present disclosure. As shown in FIG. 12, the server device SV includes a controller 30, a communicator 31 and a storage 32. The controller 30 includes a communication controller 301, a voice controller 302, a speaking terminal identifier 40, a state identifier 50, a specific voice detector 60 and a statistics calculator 70.

The controller 30 controls the communicator 31 and the storage 32. The hardware configuration of the controller 30 is the same as the hardware configuration of the second controller 20 of FIG. 2.

The communicator 31 is a communication device, and includes, for example, a network interface controller (NIC) which performs communication according to a predetermined communication protocol. The communicator 31 is connected to the network NW by wired or wireless connection. The hardware configuration of the communicator 31 is the same as the hardware configuration of the second communicator 24 of FIG. 2.

The communicator 31 receives the first state data D10 from the first terminal device TM1. Specifically, the communicator 31 receives the image data D11 and the voice data D12 of the first user U1 from the first terminal device TM1.

The communicator 31 receives the second state data D20 from the second terminal device TM2. Specifically, the communicator 31 receives the image data D21 and the biometric data D23 of the second user U2 from the second terminal device TM2. Regardless of whether or not the voice of the second user U2 is muted, the communicator 31 receives the voice data D22 of the second user U2 from the second terminal device TM2. In other words, regardless of whether or not the voice of the second user U2 is muted, the communicator 31 shown in FIG. 2 transmits the voice data D22 of the second user U2 to the server device SV.

The storage 32 includes a storage device and stores data and computer programs. The storage 32 corresponds to an example of the non-transitory computer-readable storage medium. The hardware configuration of the storage 32 is the same as the hardware configuration of the second storage 26 of FIG. 2.

The processor of the controller 30 executes the computer programs stored in the storage device of the storage 32 to function as the communication controller 301, the voice controller 302, the speaking terminal identifier 40, the state identifier 50, the specific voice detector 60 and the statistics calculator 70.

The communication controller 301 controls the communicator 31. The communication controller 301 in the server device SV corresponds to an example of the "output controller" in the present disclosure.

Specifically, the communication controller 301 controls the communicator 31 such that the communicator 31 transmits the first state data D10 to the second terminal device TM2. Consequently, the communicator 31 transmits the first state data D10 to the second terminal device TM2. Specifically, the communicator 31 transmits the image data D11 and the voice data D12 of the first user U1 to the second terminal device TM2.

The communication controller 301 also controls the communicator 31 such that the communicator 31 transmits the second state data D20 to the first terminal device TM1. Consequently, the communicator 31 transmits the second state data D20 to the first terminal device TM1. Specifically, the communicator 31 transmits the image data D21 of the second user U2 to the first terminal device TM1.

The voice controller 302 receives a mute instruction of a voice based on the voice data D22 of the second user U2 from the second terminal device TM2 through the communicator 31. Hence, the voice controller 302 mutes, according to the mute instruction, the voice based on the voice data D22 of the second user U2. Then, when the voice of the second user U2 is muted, the communication controller 301 prevents the voice data D22 of the second user U2 from being transmitted to the first terminal device TM1. On the other hand, when the voice of the second user U2 is not muted, the communicator 31 transmits the voice data D22 of the second user U2 to the first terminal device TM1.

The speaking terminal identifier 40 identifies the first terminal device TM1 of the first user U1 serving as the speaker (speaking person). For example, the speaking terminal identifier 40 identifies the IP address of the first terminal device TM1.

The operation of the state identifier 50 (the image analyzer 501, the voice analyzer 502 and the biometric data analyzer 503) according to the second embodiment is the same as the operation of the state identifier 50 (the image analyzer 501, the voice analyzer 502 and the biometric data analyzer 503) of FIG. 2. The operation of the specific voice detector 60 according to the second embodiment is the same as the operation of the specific voice detector 60 of FIG. 2.

For example, the state identifier 50 analyzes the second state data D20 of the second user U2 to identify the state of the second user U2.

Then, the communication controller 301 transmits, through the communicator 31, to the first terminal device TM1, the analysis information AN2 indicating the result of the identification of the state of the second user U2 performed by the state identifier 50, and thereby causes the first terminal device TM1 to display the analysis information AN2. In other words, the communication controller 301 causes the first terminal device TM1 to output the analysis information AN2. Hence, in the second embodiment, the first user U1 serving as the speaker sees the analysis information AN2 in the first terminal device TM1 to be able to easily recognize the state of the second user U2 serving as the listener (for example, the reaction of the second user U2).

Preferably, when the voice based on the voice data D22 of the second user U2 is muted, the state identifier 50 identifies the state of the second user U2. Then, when the voice based on the voice data D22 of the second user U2 is muted, the communication controller 301 transmits the analysis information AN2 to the first terminal device TM1 through the communicator 31, and thereby causes the first terminal device TM1 to display the analysis information AN2. In other words, when the voice based on the voice data D22 of the second user U2 is muted, the second communication controller 203 causes the first terminal device TM1 to output the analysis information AN2. The advantages of the preferred example described above are the same as in the first embodiment.

As in the first embodiment, for example, the image analyzer 501 analyzes the image data D21 of the second user U2 to identify the state of the second user U2 indicated by the facial expression of the face of the second user U2. Then, the communication controller 301 transmits, to the first terminal device TM1, the analysis information AN21 indicating the result of the identification of the state of the second user U2 performed by the image analyzer 501, and thereby causes the first terminal device TM1 to display the analysis information AN21.

Furthermore, as in the first embodiment, for example, the voice analyzer 502 analyzes the voice data D22 of the second user U2 to identify the state of the second user U2 indicated by the voice of the second user U2. Then, the communication controller 301 transmits, to the first terminal device TM1, the analysis information AN22 indicating the result of the identification of the state of the second user U2 performed by the voice analyzer 502, and thereby causes the first terminal device TM1 to display the analysis information AN22.

As in the first embodiment, for example, the specific voice detector 60 analyzes the voice data D12 of the first user U1 to detect a voice indicating a question from the first user U1. Then, when the voice indicating the question from the first user U1 is detected, the voice analyzer 502 analyzes the voice data D22 of the second user U2 to distinguish the content of the reaction of the second user U2 to the question of the first user U1. Furthermore, the communication controller 301 transmits, to the first terminal device TM1, the analysis information AN22 including the result of the distinguishing of the content of the reaction of the second user U2, and thereby causes the first terminal device TM1 to display the analysis information AN22. In other words, the communication controller 301 causes the first terminal device TM1 to output the analysis information AN22 including the result of the distinguishing of the content of the reaction of the second user U2.

Furthermore, as in the first embodiment, for example, the biometric data analyzer 503 analyzes the biometric data D23 of the second user U2 to identify the state of the second user U2 indicated by the biometric information of the second user U2. Then, the communication controller 301 transmits, to the first terminal device TM1, the analysis information AN23 indicating the result of the identification of the state of the second user U2 performed by the biometric data analyzer 503, and thereby causes the first terminal device TM1 to display the analysis information AN23.

The operation of the statistics calculator 70 according to the second embodiment s the same as the operation of the statistics calculator 70 of FIG. 3. For example, as in the first embodiment, the statistics calculator 70 calculates the statistics of the pieces of analysis information AN2 respectively indicating the results of the identification of the states of the second users U2. Then, the communication controller 301 transmits the statistics information ST indicating the result of the statistics calculated by the statistics calculator 70 to the first terminal device TM1 and the second terminal devices TM2 through the communicator 31, and thereby causes the first terminal device TM1 and the second terminal devices TM2 to display the statistics information ST. In other words, the communication controller 301 causes the first terminal device TM1 and the second terminal devices TM2 to output the statistics information ST. Hence, in the second embodiment, the first user U1 serving as the speaker sees the statistics information ST in the first terminal device TM1 to be able to intuitively recognize the states of the second users U2 serving as the listeners (for example, the reactions of the second users U2). The second user U2 serving as the listener sees the statistics information ST in the second terminal device TM2 to be able to intuitively recognize the states of the other second users U2 serving as the listeners (for example, the reactions of the other second users U2).

Preferably, as in the first embodiment, for example, the statistics calculator 70 calculates the statistics of the pieces of analysis information AN2 to produce the graph GP which indicates the result of the statistics as the statistics information ST.

Figure 13:
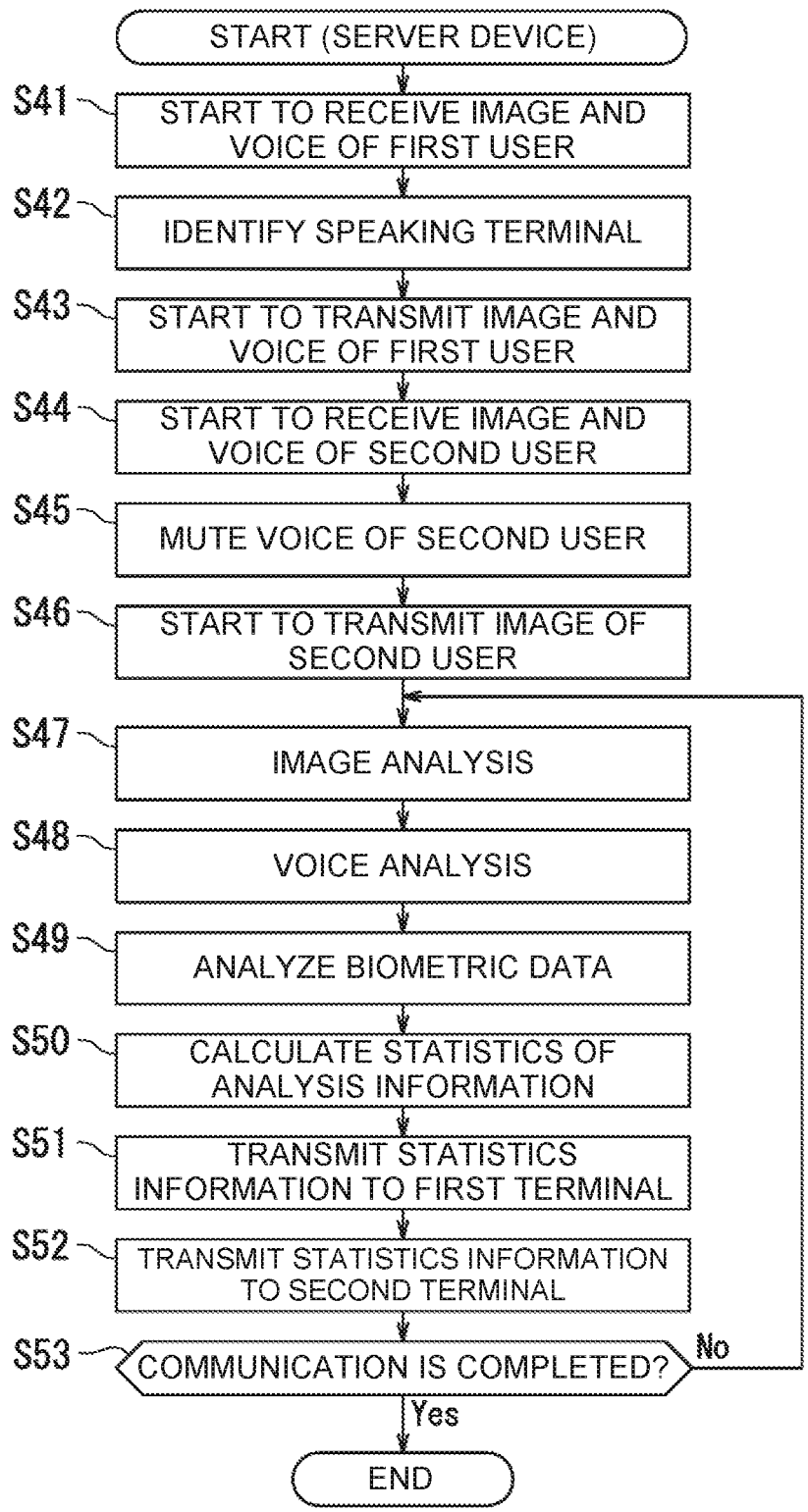
FIG. 13 is a flowchart showing the processing of the server device according to the second embodiment.

The processing of the server device SV will then be described with. reference to FIGS. 12 and 13. FIG. 13 is a flowchart showing the processing of the server device SV.

As shown in FIG. 13, the processing of the server device SV includes steps S41 to S53. Specifically, the computer programs stored in the storage 32 of the server device SV instruct the controller 30 of the server device SV to perform the processing of steps S41 to S53.

As shown in FIGS. 12 and 13, in step S41, the communication controller 301 first starts to receive the image data D11 and the voice data D12 of the first user U1 from the first terminal device TM1 through the communicator 31.

Then, in step S42, the speaking terminal identifier 40 identifies the first terminal device TM1 of the first user U1 serving as the speaker (speaking person).

Then, in step S43, the communication controller 301 starts to transmit the image data D11 and the voice data D12 of the first user U1 to the second terminal devices TM2 through the communicator 31.

Then, in step S44, the communication controller 301 starts to receive the image data D21 and the voice data D22 of the second users U2 from the second terminal devices TM2 through the communicator 31. The communication controller 301 also starts to receive the biometric data D23 of the second users U2 from the second terminal devices TM2 through the communicator 31.

Then, in step S45, the voice controller 302 mutes the voice based on the voice data D22 of the second user U2 according to the mute instruction from the second terminal device TM2.

Then, in step S46, the communication controller 301 starts to transmit the image data D21 of the second users U2 to the first terminal device TM1 through the communicator 31.

Then, in step S47, the image analyzer 501 performs image analysis on the image data D21 of the second user U2 for each of the second terminal devices TM2 (that is, for each of the second users U2). Then, the image analyzer 501 stores, in the storage 32, the analysis information AN21 indicating the result of the analysis of the facial expression of the face of the second user U2. Specifically, the image analyzer 501 stores, in the storage 32, the pieces of analysis information AN21 corresponding to the second terminal devices TM2. The processing in step S47 is the same as the processing in steps S4 to S6 of FIG. 9.

Then, in step S48, the voice analyzer 502 performs voice analysis on the voice data D22 of the second user U2 for each of the second terminal devices TM2 (that is, for each of the second users U2). Then, the voice analyzer 502 stores, in the storage 32, the analysis information AN22 indicating the result of the analysis of the voice of the second user U2. Specifically, the voice analyzer 502 stores, in the storage 32, the pieces of analysis information AN22 corresponding to the second terminal devices TM2.

Then, in step S49, the biometric data analyzer 503 performs analysis processing on the biometric data D23 of the second user U2 for each of the second terminal devices TM2 (that is, for each of the second users U2). Then, the biometric data analyzer 503 stores, in the storage 32, the analysis information AN23 indicating the result of the analysis of the biometric data D23 of the second user U2. Specifically, the biometric data analyzer 503 stores, in the storage 32, the pieces of analysis information AN23 corresponding to the second terminal devices TM2.

Then, in step S50, the statistics calculator 70 calculates the statistics of the pieces of analysis information AN2 respectively indicating the results of the identification of the states of the second users U2, and thereby produces the statistics information ST indicating the result of the statistics. Specifically, the statistics calculator 70 produces the graph GP as the statistics information ST. The analysis information AN2 includes the analysis information AN21 to AN23.

Then, in step S51, the communication controller 301 transmits the statistics information ST (specifically, the graph GP) to the first terminal device TM1 through the communicator 31.

Then, in step S52, the communication controller 301 transmits the statistics information ST (specifically, the graph GP) to the second terminal devices TM2 through the communicator 31.

Then, in step S53, the communication controller 301 determines whether or not communication between the first terminal device TM1 and the second terminal device TM2 is completed.

When it is determined in step S53 that the communication is not completed, the processing proceeds to step S47.

On the other hand, when it is determined in step S53 that the communication is completed, the processing is completed.

The embodiments of the present disclosure have been described above with reference to the drawings. However, the present disclosure is not limited to the embodiments described above, and various aspects can be performed without departing from the spirit thereof. A plurality of constituent elements disclosed in the embodiments described above can be varied as necessary. For example, a certain constituent element among all the constituent elements described in a certain embodiment may be added to the constituent elements of another embodiment or some constituent elements among all the constituent elements described in a certain embodiment may be deleted from the embodiment.

For ease of understanding of the disclosure, the drawings are schematically shown mainly on the individual constituent elements, and the thicknesses, the lengths, the numbers, the intervals and the like of the constituent elements shown in the drawings may be different from the actual values for convenience of production of the drawings. The configurations of the constituent elements in the embodiments described above are examples, the present disclosure is not particularly limited and it is needless to say that various variations can be made without substantially departing from the effects of the present disclosure.

(1) Preferably, the second state detector 25 shown in FIG. 2 includes at least the second image capturer 261 or the second voice inputter 262. The second state detector 25 does not need to include the second biometric information detector 263. The first state detector 15 shown in FIG. 3 does not need to include the first biometric information detector 153.

Preferably, the state identifier 50 of FIGS. 2 and 12 includes at least the image analyzer 501 or the voice analyzer 502. The state identifier 50 does not need to include the biometric data analyzer 503.

Furthermore, based on part or all of the image data D21, the voice data D22 and the biometric data D23, the state identifier 50 may identify the state of the second user U2 to generate the analysis information AN2 (hereinafter referred to as the "analysis information AN24") indicating the result of the identification. Based on part or all of the analysis information AN21 obtained by the image analyzer 501, the analysis information AN22 obtained by the voice analyzer 502 and the analysis information AN23 obtained by the biometric data analyzer 503, the state identifier 50 may identify the state of the second user U2 to generate the analysis information AN2 (hereinafter referred to as the "analysis information AN25") indicating the result of the identification.

Furthermore, the statistics calculator 70 shown in FIGS. 2 and 12 may calculate the statistics of the pieces of analysis information AN21 to generate the statistics information ST indicating the result of the identification, may calculate the statistics of the pieces of analysis information AN22 to generate the statistics information ST indicating the result of the statistics or may calculate the statistics of the pieces of analysis information AN23 to generate the statistics information ST indicating the result of the statistics. The statistics calculator 70 may also calculate the statistics of pieces of analysis information AN24 or pieces of analysis information AN25 to generate the statistics information ST indicating the result of the statistics.

(2) The arrangement of the state identifier 50 and the specific voice detector 60 shown in FIGS. 2 and 12 and the statistics calculator 70 shown in FIGS. 3 and 12 is not particularly limited. In other words, each of the state identifier 50, the specific voice detector 60 and the statistics calculator 70 may be realized in any one of the first controller 10 of the first terminal device TM1, the second controller 20 of the second terminal device TM2 and the controller 30 of the server device SV.

For example, the state identifier 50, the specific voice detector 60 and the statistics calculator 70 may be realized with the first controller 10 of the first terminal device TM1 or may be realized with the second controller 20 of the second terminal device TM2. Although in the first embodiment, the statistics calculator 70 is realized with the first controller 10 of the first terminal device TM1, for example, the two-way communication support system SYS according to the first embodiment may include the server device SV such that the statistics calculator 70 is realized with the controller 30 of the server device SV. In the first embodiment or the second embodiment, for example, the specific voice detector 60 may be realized with the first controller 10 of the first terminal device TM1.

(3) The second state detector 25 shown in FIG. 2 may include another sensor as long as the state of the second user U2 can be detected. The sensor detects the state of the second user U2. Then, the sensor outputs the second state data D20 indicating the state of the second user U2 to the state identifier 50. Furthermore, the state identifier 50 analyzes the second state data D20 output by the sensor to identify the state of the second user U2 (for example, the reaction).

For example, the second display 22 of the second terminal device TM2 may display a widget (for example, a button) of a GUI (Graphical User Interface). In this case, the widget indicates the "content of a reaction" when the second user U2 reacts to the question of the first user U1. For example, the "content of the reaction" is a positive reaction such as "good" or a negative reaction such as "no". For example, the widget is a "good" button or a "no" button.

The second communication controller 203 of the second terminal device TM2 transmits, as the analysis information AN2, the content of the operation of the widget to the first terminal device TM1 or the server device SV. Then, the statistics calculator 70 calculates the statistics of the pieces of analysis information AN2 transmitted from the second terminal devices TM2.

(4) The two-way communication support system SYS can also support, for example, two-way communication in events such as an online seminar and an online live. In the event, for example, a sender (first user U1) distributes video and voices to a large number of viewers (second users U2). In this case, for example, a large number of viewers may be present in the same place (for example, a seminar venue or a concert hall), and one or a plurality of second terminal devices TM2 may be prepared. For example, a large number of viewers may be separately present, and a large number of second terminal devices TM2 may be prepared so as to respectively correspond to a large number of viewers. In these cases, for example, the analysis information AN2 obtained by the state identifier 50 or the statistics information ST obtained by the statistics calculator 70 indicates the "degree of excitement" of the viewers. The "degree of excitement" of the viewers is indicated by, for example, a value or a graph.

What is claimed is:

1. A two-way communication support system that supports two-way communication between a first terminal device and a second terminal device
    which receives, from the first terminal device, first state data changed according to a state of a speaker present on a side where the first terminal device is arranged and
    which outputs an image and a voice indicated by the first state data, the two-way communication support system comprising:
  a state identifier that analyzes second state data changed according to states of a plurality of listeners present on a side where the second terminal device is arranged so as to identify the states of the plurality of listeners;
  an output controller that causes the first terminal device to output analysis information indicating a result of the identification of the states of the plurality of listeners performed by the state identifier, and
  a storage that stores therein voice patterns of people indicating questions made by the people,
  wherein the second state data includes voice data generated by inputting a voice of the plurality of listeners,
  wherein the state identifier includes a voice analyzer,
  wherein the voice analyzer analyzes the voice data of the plurality of listeners so as to identify the states of the plurality of listeners indicated by the voice of the plurality of listeners,
  wherein the first state data includes voice data generated by inputting a voice of the speaker,
  wherein the two-way communication support system further includes a specific voice detector that detects a voice indicating a question from the speaker by performing pattern matching on the voice data of the speaker using the voice patterns stored in the storage,
  wherein when the voice indicating the question from the speaker is detected, the voice analyzer statistically analyzes the voice data of the plurality of listeners so as to distinguish contents of reactions of a portion of the plurality of listeners in comparison with reactions of other listeners of the plurality of listeners and to generate the analysis information,
  wherein the second state data further includes biometric data indicating biometric information of the plurality of listeners,
  wherein the state identifier further includes a biometric data analyzer, and
  wherein the biometric data analyzer analyzes the biometric data of the plurality of listeners so as to further identify the states of the plurality of listeners as further indicated by the biometric information of the plurality of listeners and to further modify the analysis information, and
  wherein the output controller causes the first terminal device to display a graphic output depicting the analysis information comprising a distribution, a tendency, or characteristics of the contents of reactions of the plurality of listeners to the question from the speaker.

2. The two-way communication support system according to claim 1,
    wherein the second state data includes image data generated by capturing images of faces of the plurality of listeners,
    the state identifier includes an image analyzer, and
    the image analyzer analyzes the image data of the plurality of listeners so as to identify the states of the plurality of listeners indicated by a facial expression of the faces of the plurality of listeners.

3. The two-way communication support system according to claim 1,
    wherein when the voices of the plurality of listeners are muted, the state identifier identifies the states of the plurality of listeners, and the output controller causes the first terminal device to output the analysis information indicating a result of the identification of the states of the plurality of listeners performed by the state identifier.

4. The two-way communication support system according to claim 1, further comprising:
    a statistics calculator that calculates statistics of a plurality of pieces of the analysis information which respectively indicates results of the identification of the states of the plurality of listeners,
    wherein the output controller causes the first terminal device to output statistics information indicating a result of the statistics calculated by the statistics calculator.

5. The two-way communication support system according to claim 4,
    wherein the statistics calculator produces a graph as the statistics information, and
    the output controller causes the first terminal device to display the graph.

6. The two-way communication support system according to claim 4,
    wherein the output controller further causes the second terminal device to output the statistics information.

7. A non-transitory computer-readable storage medium that stores a computer program,
    wherein a computer of a two-way communication support system that supports two-way communication between a first terminal device and a second terminal device which receives, from the first terminal device, first state data changed according to a state of a speaker present on a site where the first terminal device is arranged and which outputs an image and a voice indicated by the first state data is instructed by the computer program to perform;
    identifying states of a plurality of listeners present on a site where the second terminal device is arranged by analyzing second state data changed according to the states of the plurality of listeners;
    causing the first terminal device to output analysis information indicating a result of the identification of the states of the plurality of listeners; and
    storing voice patterns of people indicating questions made by the people,
    wherein the second state data taught includes voice data generated by inputting a voice of the plurality of listeners, the identifying of the states of the plurality of listeners comprises analyzing voice data associated with a voice of the plurality of listeners, so as to identify the states of the plurality of listeners indicated by the voice of the plurality of listeners in comparison with reactions of other listeners and to generate the analysis information, the first state data includes voice decor generated by inputting the voice of the speaker, the computer is instructed by the computer program to further perform detecting a specific voice indicating a question from the speaker by analyzing the voice data of the speaker and by performing pattern matching on the voice data of the speaker using the voice patterns stored in the storage, when the voice indicating the question from the speaker is detected, the voice data of the plurality of listeners is statistically analyzed to distinguish content of a reaction of the plurality of listeners and to generate the analysis information, wherein the second state data further includes biometric data indicating biometric information of the plurality of listeners, wherein the state identifier further includes a biometric data analyzer, and wherein the biometric data analyzer analyzes the biometric data of the plurality of listeners so as to further identify the states of the plurality of listeners as further indicated by the biometric information of the plurality of listeners and to further modify the analysis information, and the first terminal device is caused to display a graphic output depicting the analysis information comprising a distribution, a tendency, or characteristics of the contents of the reactions of the plurality of listeners to the question from the speaker.

8. The two-way communication support system according to claim 1, wherein the reactions of the plurality of listeners comprise one of a positive reaction, a negative reaction, or no reaction.

9. The non-transitory computer-readable storage medium according to claim 7, wherein the reactions of the plurality of listeners comprise one of a positive reaction, a negative reaction, or no reaction.

* * * * *